Oct. 29, 1968  K. ZYGMUNT ET AL  3,407,884
TWO-WAY GROUND BURROWING DEVICE
Filed April 11, 1967  5 Sheets-Sheet 1

INVENTORS
KAZIMIERZ ZYGMUNT
TADEUSZ GERLACH

BY
ATTORNEYS

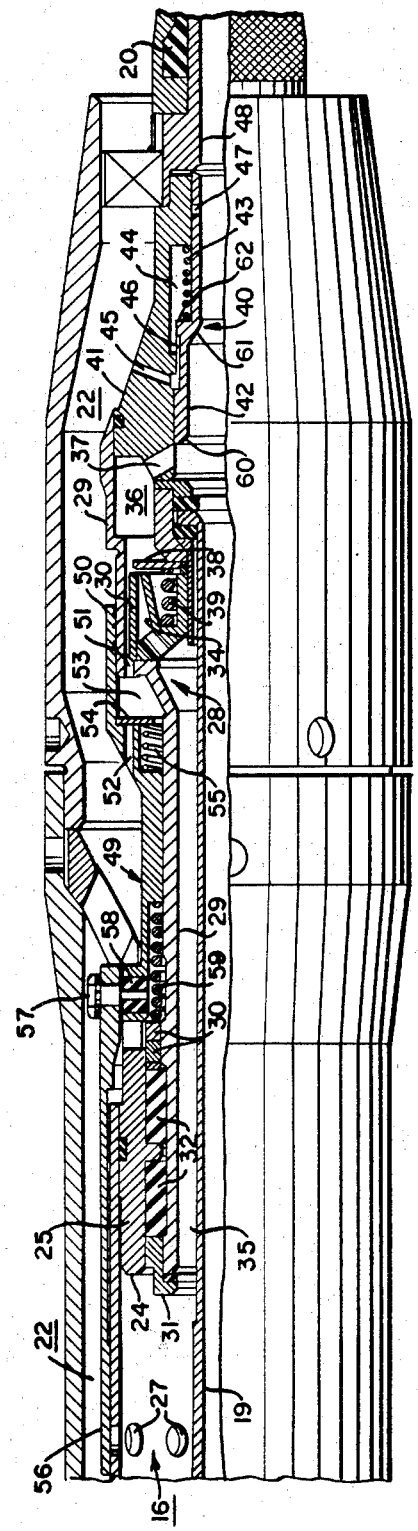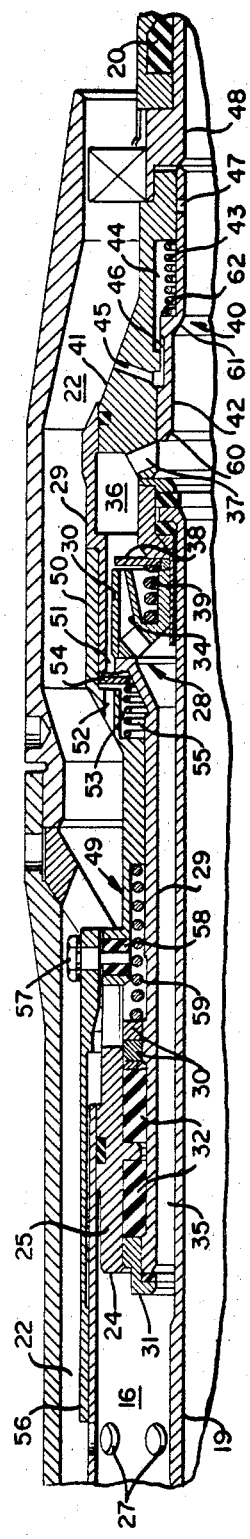

Oct. 29, 1968    K. ZYGMUNT ET AL    3,407,884
TWO-WAY GROUND BURROWING DEVICE
Filed April 11, 1967    5 Sheets-Sheet 3
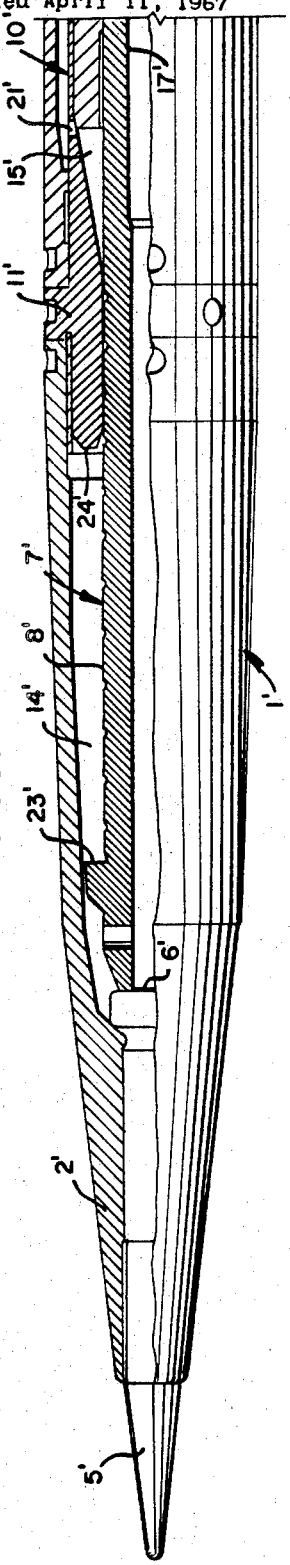
FIG. 4
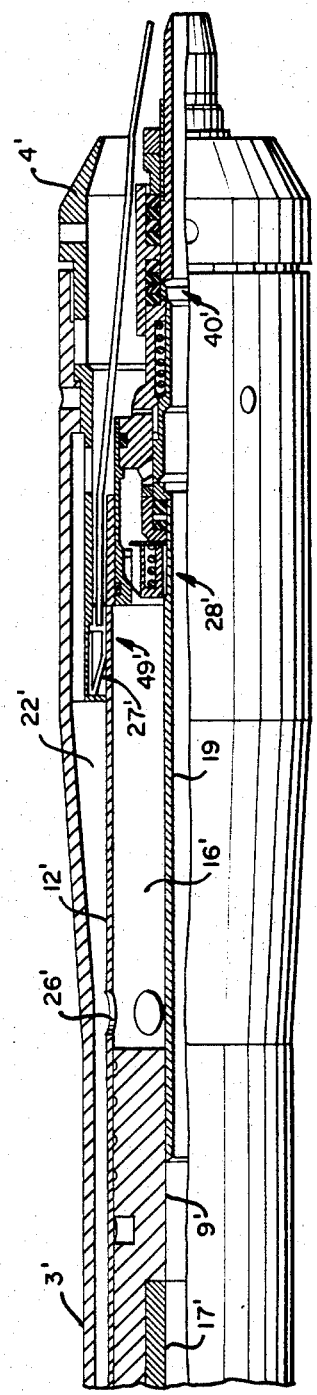
INVENTORS
KAZIMIERZ ZYGMUNT
TADEUSZ GERLACH
BY
ATTORNEYS

INVENTORS
KAZIMIERZ ZYGMUNT
TADEUSZ GERLACH

BY
ATTORNEYS

United States Patent Office 3,407,884
Patented Oct. 29, 1968

3,407,884
TWO-WAY GROUND BURROWING DEVICE
Kazimierz Zygmunt and Tadeusz Gerlach, both of 78 Chrzanowskiego St., Gdansk, Wrzeszcz, Poland
Continuation-in-part of application Ser. No. 414,054, Nov. 25, 1963. This application Apr. 11, 1967, Ser. No. 629,985
14 Claims. (Cl. 173—91)

ABSTRACT OF THE DISCLOSURE

A pneumatically driven ground burrowing device having a driving ram contained therein and oppositely facing anvil walls at the opposite ends of the ram, and a pneumatically operated control mechanism for driving the ram in a working stroke toward either of the anvil walls to selectively drive the device in a forward burrowing direction through the ground or a rearward retracting direction through the burrowed hole.

Cross-reference to related application

This application is a continuation-in-part of our copending application, Ser. No. 414,054 filed Nov. 25, 1963, now abandoned and entitled "Self-Moving Pneumatic Hammer for Ground Burrowing."

BACKGROUND OF THE INVENTION

Field of the invention

The present invention pertains to devices for burrowing holes in the ground and more particular to a pneumatically operated ground burrowing device capable of being driven under power in both a forward burrowing direction and a rearward retracting direction with the driving mechanism for producing such movement being contained wholly within the device and actuated by compressed air fed from a source outside the burrowed hole.

Description of the prior art

Ground burrowing devices to which the present invention relates have been constructed for two-way power operation. This two-way power operation is advantageous in that the same pneumatic pressure source used in driving the device in a forward burrowing direction may also be used in power driving the device in a retracting direction. In burrowing a horizontal hole through the ground, for example, it is sometimes not convenient to remove the device through the forward end of the hole when the burrowing operation has been completed. Also, in burrowing a hole, an immovable object may occasionally be encountered and require rearward removal of the device from the burrowed hole. Devices constructed to operate under power in both a forward and rearward direction are disclosed, for example, in U.S. Patent No. 3,137,483 granted June 16, 1964. In such devices two chambers are formed internally of the device by the internally disposed hammering ram and these chambers are provided with separate outlet passageways for effecting forward and rearward motion, with the reversing of the motion requiring the closing of one of the passageways and the opening of the other. With this construction, the necessary cross-sectional size of the passageways is quite large and this renders it difficult and expensive to construct a workable device. Besides the difficulties encountered in providing room for the two passageway systems inside the device while still maintaining the overall outer dimension within reasonable limits, difficulties with the normal operation of the device are sometimes encountered due to the necessity of connecting the closed passageways, capable of receiving a large pneumatic flow, with the interior of the cylinder.

SUMMARY OF THE INVENTION

In accordance with the teachings of the present invention, a self-moving ground burrowing device having an improved construction for effecting forward and rearward motion and having an improved efficiency is provided. The ground burrowing device generally includes an outer casing, a separate inner cylinder and a piston ram slidably disposed within the inner cylinder for movement in a driving stroke toward either a front anvil wall located at the front end of the cylinder or toward a back anvil wall located at the rear of the device. In addition a hose is provided for supplying pneumatic pressure such as compressed air to the interior of the device through the rearward end thereof, and an internally contained valve mechanism is provided for changing the direction of flow of the compressed air through the interior of the device to effect either a forward driving movement through the ground or a retracting movement through the burrowed hole. The inner cylinder and ram member of the device divide the interior thereof into three chambers, namely a front chamber which is kept in continual communication with the source of compressed air through a conduit extending through the ram to continually urge the ram with a predetermined force in a rearward direction; a middle chamber surrounding the ram intermediate its ends and which is kept in continual communication with the atmosphere through an exhaust passageway; and a rear chamber disposed rearwardly of the ram and which is selectively connectable in a prescribed manner to the source of compressed air for driving the device in a forward direction and to atmosphere for driving the device in a rearward retracting direction.

With applicants' construction, the overall cross-sectional dimension of the device may be made small since the passageway supplying compressed air to the front chamber extends through the ram rather than through the outer casing structure; and since the control mechanism for changing the direction of movement of the device is wholly contained and operable in the rear of the device while the front chamber remains in communication with the source of compressed air, the construction of the device is greatly simplified. Furthermore, by containing the ram within a separate cylinder disposed internally of the device, the outer casing of the device may be subjected to external deforming forces as it is moved through the ground without causing deformation of the inner cylinder with resulting binding of the ram and failure of the device.

BRIEF DESCRIPTION OF THE DRAWINGS

FIG. 2 is an enlarged sectional view showing the reversing mechanism of the embodiment of the invention shown in FIG. 1 in position for effecting forward movement of the device;

FIG. 3 is an enlarged sectional view similar to FIG. 2 and showing the reversing mechanism in position for effecting a rearward movement of the device;

Figure 5:
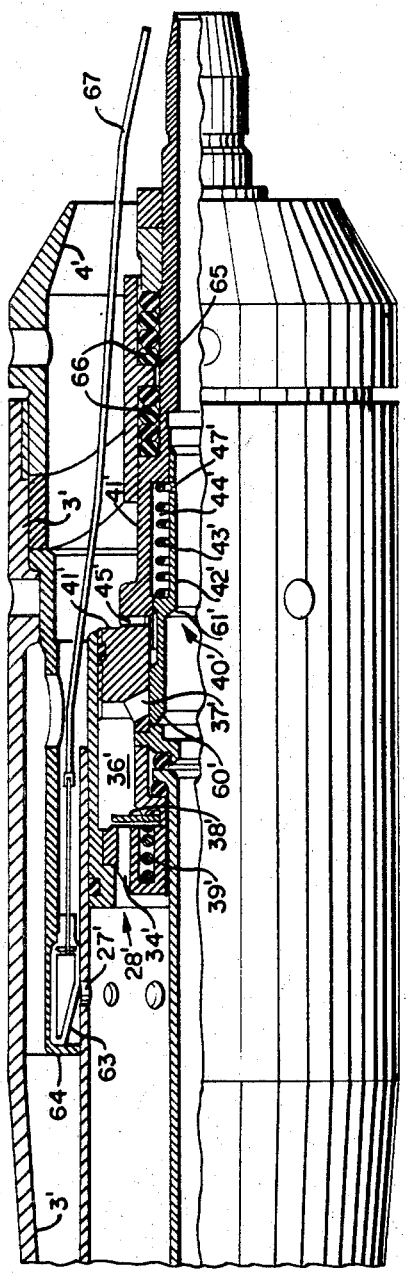
Figure 6:
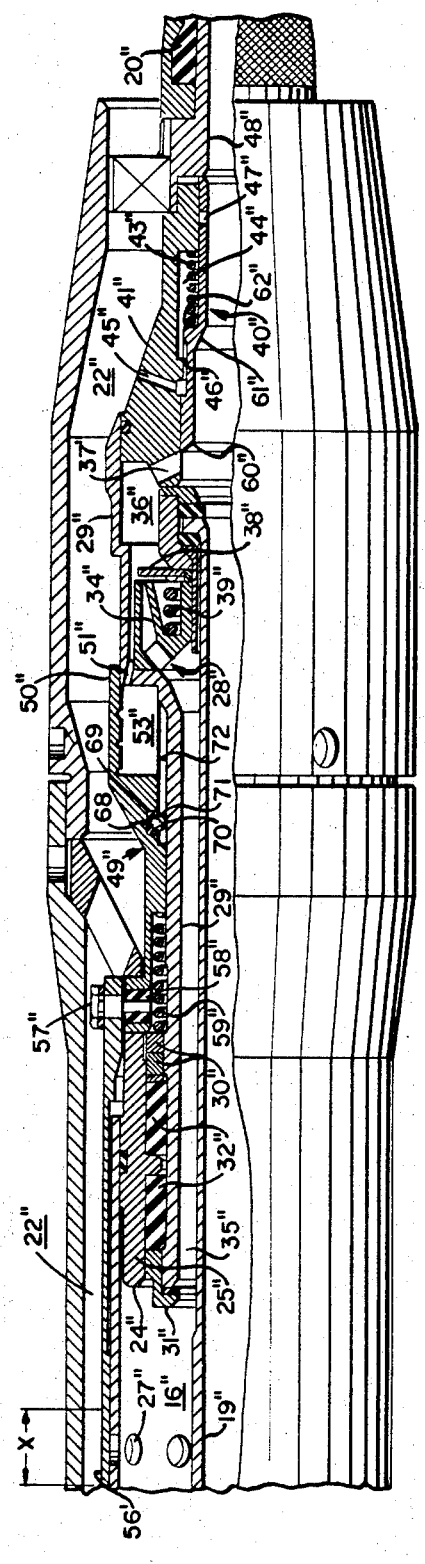
Figure 7:
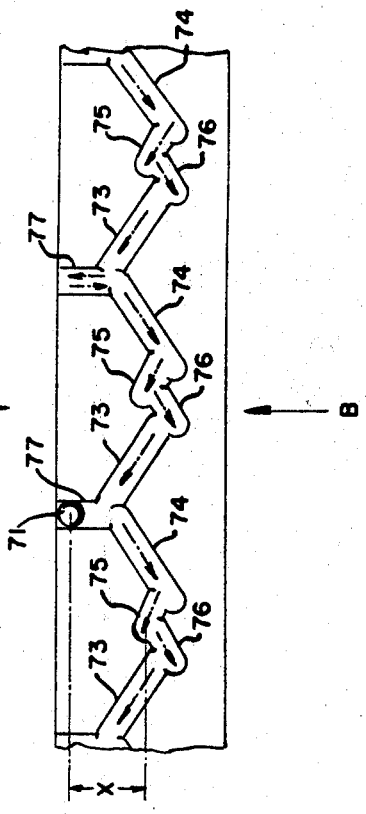

FIG. 4 is a longitudinal sectional view of a modified embodiment of the present invention;

FIG. 5 is an enlarged sectional view showing the reversing mechanism of the embodiment of the invention shown in FIG. 4;

FIG. 6 is an enlarged sectional view showing the reversing mechanism of still another embodiment of the present invention; and FIG. 7 is an expanded view of the guide track of the reversing mechanism shown in FIG. 6.

*Description of the preferred embodiments*

Figure 1:
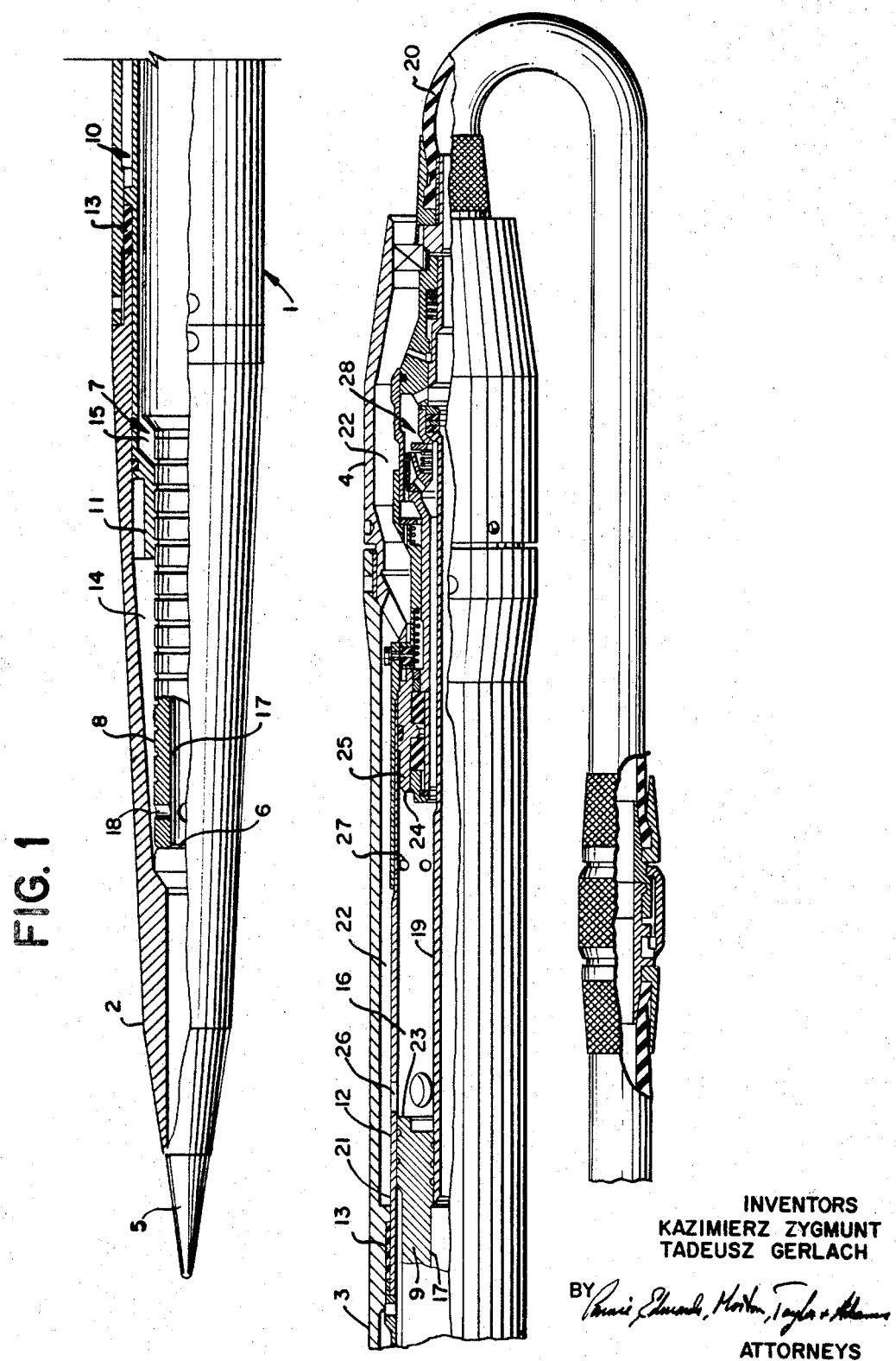
FIG. 1 is a longitudinal sectional view of one embodiment of the present invention.

With reference to FIG. 1, the embodiment of the ground burrowing device there shown comprises an outer casing 1 which includes a front projectile shaped nose member 2, intermediate cylindrical member 3 and a rear terminal end member 4. In the nose of the device, there is located a chisel member 5, or other suitable cutting implement, the back end of which forms a front anvil wall 6 for a ram member 7. The ram member is located internally of the outer casing 1 and has a reduced front section 8 and an enlarged rear section 9 slidably disposed within an inner cylinder member 10. The cylinder 10, is, in turn, constructed with a front section 11 sealingly engaging and supporting the front section of the ram and an enlarged rear section 12 sealingly engaging and supporting the rear section of the ram. The cylinder 10 is fixed to the outer casing by threading the cylindrical member 3 thereof onto the nose member 2 and the cylinder 10 is held resiliently in place by the flexible elastic elements 13 which may be made of rubber or similar material.

The ram and inner cylinder of the device divided its interior into three separate chambers spaced axially therealong. These chambers are the front chamber 14, the middle chamber 15 and the rear chamber 16.

The front chamber 14 surrounds the front end of the ram and is continually maintained in communication with the source of compressed air used in operating the device. For this purpose, the ram is provided with an axially extending conduit 17. The forward end of this conduit extends through the forward end of the ram; and in addition, radial bores 18 are provided in the forward end of the ram so that the chamber 14 will remain in communication with the conduit 17 when the ram is in abutment against the anvil wall 6. To the rear of the ram a cylindrical duct 19 is connected and this duct leads to a flexible hose 20 connected to the rear end of the device.

The middle chamber 15 surrounds the ram intermediate its ends and is continuously maintained in communication with the atmosphere by exhaust ports 21 in the wall of the cylinder 10 leading to an exhaust passageway 22. The passageway 22 is formed by the radial spacing between the enlarged rear section 12 of the cylinder and the intermediate cylindrical member 3 of the outer casing and extends through the terminal end member 4 at the rear end of the device.

The rear chamber 16 is defined by the spacing between the enlarged rear section 12 of the cylinder 10 and the cylindrical duct 19. This chamber is bounded at its axial ends by the rear end 23 of the ram and by the forwardly facing wall 24 of a buffer member 25 located at the rear end of the cylinder 10. The wall 24 defines the rear anvil wall of the device as more fully described below. The rear chamber 16 has two sets of ports 26 and 27 leading to the exhaust passageway 22. The ports 26 function as primary ports and are located near the forward end of the rear chamber and the ports 27 function as auxiliary ports and are located near the rearward end of this chamber.

The control valve structure for operating the device in both a forward and rearward direction is shown at 28. This valve includes a casing 29 connected to the buffer member 25 in the rear of the cylinder 10 by nuts 30, 31 and rubber shock absorbers 32. Inside the casing 29 there is a valve body member 33. Extending through the body member there are a multiplicity of air ducts 34. These air ducts at their forward end communicate with the rear chamber 16 via the air inlet passageway 35 provided by the spacing between the duct 19 and the casing 29. The rear end of these ducts 34 open into an annular chamber 36 which is connected via a plurality of radial openings 37 with the source of compressed air entering the rear of the device through the hose 20. The valve 28 further includes a valve ring plate 38 and a valve spring 39. The plate 38 is adapted to move between a closed position engaging the body member 33 and closing the air ducts 34 and an open position spaced from the body member to effect repeated actuation of the device in either a forward or rearward direction as more fully described below.

Positioned rearwardly of the valve mechanism 28 is the starting valve 40 of the device. The starting valve includes an outer body member 41 connected within the rear of the casing 29 and a slider valve member 42 slidably disposed within the outer body member 41. A spring 43 normally urges the slider valve 42 forwardly of the device into a position closing the opening 37 to the chamber 36. The spring 43 is positioned within a chamber 44 formed between the slider valve 42 and the outer body member 41; and depending on the position of the valve 42, this chamber is adapted to connect with either the atmosphere through the ports 45 and grooving 46 or with the source of compressed air through the ports 47. The starting valve is supported within the device by means of wing shaped consoles of the terminal member 48 which also serve to fix the hose 20 for the compressed air supply.

For controlling the direction of movement of the device a servomotor comprising a reversing valve 49 is provided. This reversing valve includes a cylinder member 50 slidably mounted on the casing 29 of the control valve 28. The rearward end of the cylinder 50 is connected by means of rear ports 51 with the chamber 36 and the forward end thereof to the exhaust passageway by means of the forward ports 52. These ports 51 and 52 also connect to a common chamber 53 in which a valve plate 54 and spring 55 are contained. The reversing valve also includes a slider member 56 slidably received over the rear section of the cylinder 10. The slider member 56 is connected to the cylinder member 50 by means of two screws 57, only one of which is shown in the drawings, and the elastic bushes 58. The reversing valve is urged rearwardly of the device by means of a spring member 59.

The reversing valve functions to effect an opening and closing of the auxiliary ports 27 in the cylinder 10 connecting the rear chamber 16 to the exhaust passageway 22. FIG. 2 shows the position of the reversing valve when the device is to be driven in a forward direction. As there indicated, the auxiliary ports 27 are closed by the slider member 56. FIG. 3, on the other hand, shows the reversing valve in a retracted position opening the auxiliary ports 27. In this position, the device will be driven in a rearward direction. In both FIGS. 2 and 3, the parts of the device are shown under operating conditions with compressed air being supplied through the hose 20 to the interior chamber and valves.

The operation of the embodiment of the invention shown in FIGS. 1–3 is as follows: First, assuming that no compressed air has yet been supplied to the device, the starting valve 40 will, due to the action of the spring 43, be in a forward position closing the openings 37 while the slider member 56 of the reversing valve will be in its rearward position due to the action of the spring 59. Also, the valve plate 54 of the reversing valve and the valve plate 38 of the control valve will be in their rearward positions due to the action of the springs 55 and 39. Accordingly, the ports 51 of the reversing valve will be closed and the air ducts 34 of the control valve will be open.

When starting the device for forward movement, compressed air is supplied through the hose 20. The compressed air flows from the hose through the starting valve slider 42, the duct 19, the axial conduit 17 and radial bores 18 of the ram 7 and into the forward chamber 14. The compressed air also flows through the ports 47 in the starting valve slider member and into the chamber 44 to keep the starting valve in its forward position. The starting valve will remain in this forward position until the pressure of the compressed air reaches a predetermined value and the force of the air acting against the forward surfaces 60, 61 thereof is sufficient to overcome the spring 43 and the force of the air acting against the rearward surface 62 of the slider 42. Since it takes a period of time for the pressure to build up in the interior of the device, the starting valve will not immediately move to its retracted position. Accordingly, the chamber 36 will not receive any compressed air and thus the compressed air will be prevented from entering the rear chamber 16 via the air ducts 34 and the air inlet passageway 35.

As the pressure within the front chamber increases, the ram will be caused to move in a rearward direction and since the auxiliary ports 27 of the rear chamber are open, there will be no resistance to the rearward movement until the ram passes over these ports. At this time, the slider valve 42 will be caused to move rearwardly and the chamber 44 will become connected to atmosphere through the grooves 46 and ports 45. Once the starting valve has been moved rearwardly, it will remain there during the entire working time of the device; and once it is moved to this retracted position, compressed air will enter the chamber 36, pass through the ports 51 and act against the valve plate 54 of the reversing valve. In forward operation, the pressure of the compressed air supplied to the device will be high enough so that the air acting against the valve plate 54 will be sufficient to overcome the force of the spring 55 to close the ports 52 and open the ports 51 to the chamber 53. Thus the chamber 53 will be supplied with compressed air through the ports 51. For forward operation, the pressure of the compressed air supplied to the chamber 53 will be sufficient to compress the spring 59 and move the reversing valve into the forward position shown in FIG. 2 to close the auxiliary ports 27 leading to the rear chamber 16.

As the compressed air enters the chamber 36, it will also pass through the open ducts 34 of the control valve and supply full pressure to the rear chamber 16; and since the auxiliary ports 27 are held closed by the slider member 56 of the reversing valve and since the diameter of the rear end of the ram 7 is greater than the diameter of its front end, the ram will be driven forward and impact against the front anvil wall 6 causing the device to move through the ground. In the final phase of this motion, just before the ram strikes the anvil wall 6, the primary openings 26 in the rear chamber will be opened. Accordingly, the pressure in the rear chamber will drop to atmosphere and thus the compressed air within the chamber 36 will cause a closing of the valve plate 38 of the control valve. For effecting this result, the spring 39 is chosen so that by itself it is not capable of overcoming the pressure in the chamber 36 to hold the valve plate 38 open. Instead, it takes the force of this spring plus the force of the compressed air from the chamber 16 acting through the air ducts 34 to hold this valve plate open when the chamber 36 is supplied with compressed air.

After the impact of the ram 7 against the anvil wall 6 of the chisel 5, with the resulting opening of the primary ports 26, the compressed air in the front chamber 14 acts on the ram to move it rearwardly. After the primary openings 26 are closed by the movement of the ram, the air trapped within the rear chamber is gradually compressed. As the ram nears its rearwardmost position, this compression of the air in the rear chamber becomes sufficiently great to overcome the pressure of the compressed air in the chamber 36; and therefore, the valve plate 38 will be moved to its open position. The size of the ram 7 and cylinder 10 are such that the ram 7 in moving rearwardly effects an opening of the control valve before the ram reaches the rear anvil wall 24. With the opening of the control valve, the chamber 16 is once again supplied with full pressure of the compressed air and the ram 7 is once again driven forwardly against the anvil wall 6.

When it is desired to withdraw the burrowing device through the burrowed hole, this is simply effected by momentarily shutting off the supply of compressed air and restarting the device at a suitably lower pressure, that is, at a pressure which is low enough so that the air in the chamber 36 acting against the valve plate 54 of the reversing valve is not sufficient to overcome the spring 55. Thus the ports 51 remain closed and the slider member 56 remains in its rearward position leaving the auxiliary ports 27 of the rear chamber 16 uncovered. Accordingly, as the ram begins its forward movement toward the front anvil wall 6, the auxiliary ports will be opened and produce a pressure drop in the rear chamber 16. With this pressure drop, the compressed air within the chamber 36 of the control valve will cause the valve plate 38 to move against the action of the spring 39 and close the air ducts 34. Further movement of the ram forwardly will therefore be due to the kinetic energy and this movement will be decelerated by the pressure of the compressed air in the front chamber 14.

The position of the auxiliary ports is so determined that the ram is stopped before impact with the front anvil wall 6 and the pressure within the front chamber then drives the ram rearwardly against the rear anvil wall 24. In the final phase of the rear motion of the ram 7, it covers the auxiliary holes 27 and compresses the air contained within the rear chamber 16. This causes the valve plate 38 of the control valve to open and the compressed air entering the chamber 16 again moves the ram toward the front of the device to repeat the cycle just described.

The forward motion of the device as well as the rearward motion is only possible when the frictional forces between the outer casing of the device and the ground are sufficient to balance the recoil. The joining of the outer casing of the device with the inner cylinder 10 by means of the elastic elements 13 renders it possible, however, to use inexpensive grades of steel for the cylinder 10 since any deforming forces exerted on the outer casing are not transferred to this cylinder. Also, with the valving and chamber structure of the device shown in FIGS. 1–3, the front chamber 14 need not be vented to atmosphere to effect a forward working stroke of the ram 7 or to effect a cocking of the ram at the forward end of the device preparatory to a rearward stroke. Accordingly, the outer casing does not require any conduits leading to the front chamber 14 and thus the cross-sectional size of the device may be kept to a minimum and its overall construction greatly simplified.

In the embodiment of the present invention shown in FIGS. 4 and 5, primed reference numbers are used for designating the parts which are similar to the parts of the device shown in FIGS. 1–3.

In the device shown in FIGS. 4 and 5, the ram 7' is a two part structure and is guided in an inner one part cylinder 10'. The cylinder 10' is connected to the outer casing 1' between the nose member 2' and the cylindrical member 3' by the threaded joints at the forward end of the cylinder. As with the construction shown in FIGS. 1–3, the ram 7' has a reduced ront section 8' and an enlarged rear section 9'; and the cylinder 10' is constructed with a reduced front section 11' and an enlarged rear section 12' sealing, engaging and supporting the ram.

The movement of the ram 7' inside the cylinder 10' is limited in its forward stroke by the anvil wall 6' and in its rearward stroke by the rear face 23' of the boss contacting the front part of the cylinder 10' which defines the rear anvil wall 24' of the device. With this construction, the mounting of a separate rear buffer is avoided and the placing of the control valve 28' and the reversing valve 49' immediately in the rear of the rear section 12' of the inner cylinder 10' is rendered possible.

As in the embodiment of the invention shown in FIGS. 1–3, the ram 7' and inner cylinder 10' divide the interior of the device into a front chamber 14', a middle chamber 15' and a rear chamber 16'; and these chambers are connected to exhaust and compressed air in the same manner as with the construction of FIGS. 1–3. However, instead of using a slider member for controlling the opening and closing of the auxiliary ports 27' in the rear chamber 16', these ports are covered and opened by a modified reversing valve structure 49'.

As shown in FIGS. 4 and 5, the reversing valve includes an elastic ring valve 63 positioned in overlying relationship with the auxiliary ports 27'. The valve 63 is placed in a basket member 64 which is held fixed against the rear end of the cylindrical member 3' of the outer casing of the device by the terminal end member 4'. The terminal end member 4' also connects a shock absorber assembly 65 to the rear end of the device; and to this shock absorber assembly the outer body member 41' of the starting valve 40' is connected by means of the elastic members 66.

The valve 63 operates to close and open the auxiliary ports 27' by being inflated and deflated. For this purpose, the rear end of the valve 63 is connected via the thin conduit or hose 67 with the source of compressed air. The forward motion of the device is thus effected by filling the valve with compressed air to cause it to inflate and close the auxiliary ports 27'. Conversely, rearward motion of the device is produced by lowering the pressure inside the valve 63 to cause it to deflate and open the auxiliary ports.

In the embodiment of the device shown in FIGS. 4 and 5, the construction and operation of the control valve 28' and the starting valve 40' is the same as in the device of FIGS. 1–3. Similarly, the movement of the ram 7' is also the same as in the device shown in FIGS. 1–3. However, with the device shown in FIGS. 4 and 5, the reversing of its direction of movement through the ground does not require the reduced pressure necessary with the device of FIGS. 1–3 for effecting a rearward motion. This is advantageous under conditions where for some reason the device has become wedged in the burrowed hole or a rock or dirt has fallen down behind the device and a greater force is required to effect removal of the device from the burrowed hole.

FIGS. 6 and 7 show a third embodiment of the present invention which, like those shown in FIGS. 1–5, is constructed to operate in both the forward burrowing direction and the rearward retracting direction. With the exception of the reversing valve, the device of FIGS. 6 and 7 is substantially identical to that shown in FIGS. 1–3. Accordingly, like reference numerals with a double prime have been used to designate like parts in FIG. 6 and for a description of these parts, reference is made to the description of the device of FIGS. 1–3.

The reversing valve 49" of the construction shown in FIGS. 6 and 7 differs from that shown in FIGS. 1–3 in that its movement back and forth between a forward position closing the auxiliary ports 27" of the rear chamber 16" and a rearward position exposing these ports is not dependent on different pressures of the compressed air supplied to the device. Instead, movement between the forward and rearward positions is produced by momentarily shutting off the supply of compressed air. That is, each time the supply of compressed air is shut off and then re-established, the reversing valve will automatically shift from one position to the other. As shown in FIGS. 6 and 7, the reversing valve cylinder member 50" is slidably received over the casing 29" of the control valve 28". The axial space between the two members 50" and 29" defines a chamber 53" which is connected to the chamber 36" via the ports 51" and thus, to the source of compressed air via the openings 37". It is to be noted that no ports similar to the ports 52 of the device of FIGS. 1–3 are provided for connecting the chamber 53" to exhaust and that instead, the chambers 53" and 36" are maintained in continuous communication with each other.

On the interior wall of the cylinder 50", a circumferential groove 68 is provided. In this groove a ball race member 69 is secured; and on the surface of the race facing the casing 29" a circular ball track 70 is formed for receiving a ball member 71 of the reversing valve. The position of the ball member 71 controls the position of the reversing valve; and for this purpose, the outer surface of the casing 29" is provided with a grooved guide track 72 in which the ball rests.

In the operation of the reversing valve, the spring 59" continuously urges the slider member 56" and the cylinder member 50" with the ball 71 to the rear of the device, this direction being represented in FIG. 7 by the arrow A. When the device is connected to the source of compressed air, however, the force of the spring 59" is overcome and the reversing valve with the ball member thereof is urged forwardly or in the direction of the arrow B shown in FIG. 7. Each time the source of compressed air to the device is shut off, the spring will take over the control of the reversing valve and move it rearwardly to open the auxiliary ports 27"; and each time the source of compressed air is re-established, the reversing valve will be caused to move forwardly and the extent of this forward movement will be determined by the particular position of the ball within the track.

As shown in FIG. 7, the guide track includes a first branch section 73 extending obliquely through a first predetermined distance toward the front of the device, a second branch section 74 connected to the first branch section at a point rearwardly of its forward end and extending obliquely toward the rear of the device, a third branch section 75 connected to the second branch section at a point forwardly of its rearward end and extending obliquely through a second predetermined distance less than the first predetermined distance toward the front of the device, a fourth branch section 76 connected to the third branch section at a point rearwardly of its forward end and extending obliquely toward the rear of the device and connecting to another first branch section 73 at a point forwardly of its rearward end. This arrangement of the branch sections 73–75 is repeated to form a continuous track around the outer surface of the casing 29".

Also, as shown in FIG. 7, each of the branch sections 73 and 74 of the track are connected together in the manner described above by the axially extending sections 77. These sections receive the ball 71 as it is moved forwardly of the device under the influence of compressed air and thus lengthens the axial movement of the slider member 56" of the reversing valve.

With the above-described construction of the guide track, the ball, as it is moved forwardly and rearwardly with the cylinder member 50" of the reversing valve will also move around the casing 29" of the control valve in the direction indicated by the broken arrows. FIG. 7 shows one position of the ball as would occur with compressed air being supplied to the device. As there indicated, the ball is received in one of the axial branches 77. Thus, the slider member 56" of the reversing valve will be in its forwardmost position overlying the auxiliary ports 27" as shown in FIG. 6, the forward extent of this movement being limited by engagement of the reversing valve with the rear end of the buffer member 25".

When it is desired to reverse the direction of movement of the device, the compressed air is shut off. The spring 59" then takes control and moves the reversing valve with the ball 71 rearwardly; and due to the connection of the branch section 74 with the section 73 at a point rearwardly of the forward end of the section 73, the ball will be caused to move into the section 74 and to its rearward end. When the compressed air is resupplied to the device, the reversing valve with the ball will be forced forwardly of the device; and due to the connection of the branch section 75 with the section 74 at a point forwardly of its rearward end, the ball will be caused to move into the section 75 and to its forward end. This will stop the forward movement of the reversing valve at a location rearwardly of the auxiliary ports and thus these ports will remain uncovered and the device will operate in a retracting direction.

From the above, it will be evident that each time the compressed air is shut off and reconnected, the ball will be caused to move through the next branch sections of the guide track to alternately open and close the auxiliary ports 27″. The extent of axial movement of the reversing valve between its opened and closed positions is the distance between the forward end of the branch sections 75 and the forward end of the axial branch sections 77. This is represented in both FIGS. 6 and 7 at X.

In the description of the present invention as given above, reference has been made to three particular embodiments; however, it is to be understood that various changes may be made thereto without departing from the scope of the invention as set forth in the following claims.

What is claimed is:
1. A two-way ground burrowing device comprising:
 (a) an elongated outer casing having a tapered forward end and a hollow interior;
 (b) a ram disposed within the interior of said casing for axial movement therealong, said ram having a front section of reduced cross-sectional dimension and a rear section of enlarged cross-sectional dimension;
 (c) first supporting means for slidably and sealingly supporting the front section of said ram about its outer periphery;
 (d) second supporting means for slidably and sealingly supporting the rear section of said ram about its outer periphery;
 (e) a first chamber disposed within the interior of said casing and communicating with the front end of said ram;
 (f) a second chamber disposed within the interior of said casing and communicating with the intermediate portion of the piston where the front and rear sections join each other, said second chamber being isolated from said first chamber;
 (g) a third chamber disposed within the interior of said casing and communicating with the rear end of said ram, said third chamber being isolated from said second chamber and having one wall thereof defined by said second supporting means;
 (h) a front anvil wall positioned within the interior of said casing in the path of forward movement of said ram;
 (i) a rear anvil wall positioned within the interior of said casing in the path of rearward movement of said ram;
 (j) a compressed air inlet at the rear end of the interior of said casing adapted to be connected to an extraneous source of compressed air;
 (k) conduit means for continuously maintaining said first chamber in communication with said compressed air inlet for continuously urging said ram in a rearward direction;
 (l) first port means for continuously maintaining said second chamber in communication with the exterior of said casing;
 (m) second port means in the second supporting means for connecting the forward end of said third chamber to the exterior of said casing, said second port means being located immediately rearwardly of the rear end of said ram when said ram is in its forwardmost position abutting said front anvil wall and adapted to be closed from communication with said third chamber by the rear section of said ram when said ram is spaced rearwardly of said front anvil wall;
 (n) third port means for connecting the rearward end of said third chamber to the exterior of said casing, said third port means being located in said second supporting means whereby it is closed by the rear section of said ram immediately before said ram reaches its rearwardmost position abutting said rear anvil wall;
 (o) first valve means for selectively maintaining said third port means opened or closed independently of the opening and closing thereof by said ram; and
 (p) second valve means for connecting and disconnecting said third chamber to said source of compressed air, said valve means being responsive to changes in pressure in said third chamber and being opened by increased pressure in said third chamber.

2. A two-way ground burrowing device according to claim 1 wherein said conduit means for continuously maintaining said first chamber in communication with said compressed air inlet comprises:
 (a) an axial bore extending through said ram; and
 (b) a cylindrical duct positioned within the interior of said casing and having one end slidably and sealingly received within the axial bore of said ram at the rear thereof and its other end connected to said compressed air inlet.

3. A two-way ground burrowing device according to claim 2 wherein:
 (a) said first and second supporting means are defined by inner cylinder means connected to said outer casing and having a front section of reduced cross-sectional dimension supporting the front section of said ram and a rear section of enlarged cross-sectional dimension supporting said rear section of said ram.

4. A two-way ground burrowing device according to claim 3 wherein:
 (a) said rear anvil wall is defined by the front end of said inner cylinder means; and
 (b) said ram includes a radially outwardly extending boss adjacent its forward end having a rearwardly facing surface axially aligned with said rear anvil wall for abutting thereagainst when said ram is in its rearwardmost position.

5. A two-way ground burrowing device according to claim 4 wherein said first valve means for selectively maintaining said third port means opened or closed independently of the opening and closing of said ram comprises:
 (a) an inflatable, elastic ring valve surrounding the rear section of said inner cylinder means in overlying sealing relationship with said third port means when inflated, and in spaced relationship therewith when deflated; and
 (b) means for selectively connecting said ring valve to said source of compressed air.

6. A two-way ground burrowing device according to claim 3 wherein:
 (a) said inner cylinder means is connected to said outer casing with the front and rear sections thereof spaced radially inwardly of said outer casing.

7. A two-way ground burrowing device according to claim 6 wherein:
 (a) said rear anvil wall is disposed at the rearward end of said third chamber; and
 (b) said third chamber is defined by the rear end of said ram, the rear anvil wall and the radial space between the rear section of said inner cylinder means and said cylindrical duct.

8. A two-way ground burrowing device according to claim 7 wherein said first valve means for selectively maintaining said third port means opened or closed independently of the opening and closing thereof by said ram includes:
  (a) a cylindrical slider member slidably received over the rear section of said inner cylinder means for movement between a first forward position sealingly overlying said third port means and a second rearward position spaced rearwardly of said third port means.

9. A two-way ground burrowing device according to claim 7 wherein said first valve means for selectively maintaining said third port means opened or closed independently of the opening and closing thereof by said ram comprises:
  (a) a cylindrical slider member slidably received over the rear section of said inner cylinder means for movement between a first forward position sealingly overlying said third port means and a second rearward position spaced rearwardly of said third port means;
  (b) a wall surface connected to said slider member and facing rearwardly of said device;
  (c) fourth port means for directing compressed air against said wall surface to urge said slider member toward said first forward position;
  (d) closure means positioned forwardly of said fourth port means;
  (e) spring means for continuously exerting a predetermined force in the rearward direction of said device to urge said slider member to said second rearward position and said closure means against said fourth port means, said predetermined force being within the operating range of the pressure of the compressed air operating said device whereby compressed air supplied to said device at a pressure above said predetermined pressure will move the closure means away from said fourth port means and the slider member into said first forward position to operate the device with said third port means closed and compressed air supplied to said device at a pressure below said predetermined pressure will operate said device with said slider member in said second rearward position spaced from said third port means.

10. A two-way ground burrowing device according to claim 7 wherein said first valve means for selectively maintaining said third port means opened or closed independently of the opening and closing thereof by said ram comprises:
  (a) a cylindrical slider member slidably received over the rear section of said inner cylinder means for movement between a first forward position sealingly overlying said third port means and a second rearward position spaced rearwardly of said third port means;
  (b) a wall surface connected to said slider member and facing rearwardly of said device;
  (c) fourth port means for directing compressed air against said wall surface to urge said slider member toward said first forward position;
  (d) spring means continuously exerting a predetermined force in the rearward direction of said device to urge said slider member to said second rearward position, said predetermined force being less than the pressure of the compressed air operating said device;
  (e) a circumferentially extending ball race connected to said slider member and facing radially inwardly of said device;
  (f) a ball member disposed in said ball race;
  (g) an axially extending concentrically located surface facing said race; and
  (h) a guide track in said surface for supporting said ball member in said ball race, said guide track having:
    (1) a first branch section extending obliquely through a first predetermined distance toward the front of said device,
    (2) a second branch section connected to said first branch section at a point rearwardly of its forward end and extending obliquely toward the rear of said device,
    (3) a third branch section connected to said second branch section at a point forwardly of its rearward end and extending obliquely through a second predetermined distance less than said first predetermined distance toward the front of said device,
    (4) a fourth branch section connected to said third branch section at a point rearwardly of its forward end and extending obliquely toward the rear of said device and connecting to another first branch section at a point forwardly of its rearward end, said arrangement of said branch sections being repeated to form a continuous track around said surface whereby every other time compressed air is supplied to said device to act against said wall surface, said ball member will be caused to move to the forward end of said first branch section to move said slider member into said first position during operation of said device and every alternate time compressed air is supplied to said device said ball member will be caused to move to the forward end of said third branch section to move said slider member into a third position located between said first and second positions and spaced rearwardly of said third port means during operation of said device.

11. A two-way ground burrowing device comprising:
  (a) an elongated outer casing having a tapered forward end and a hollow interior;
  (b) a ram disposed within the interior of said casing for axial movement therealong;
  (c) a front chamber disposed within the interior of said casing and communicating with the front end of said ram;
  (d) a rear chamber disposed within the interior of said casing and communicating with the rear end of said ram;
  (e) a front anvil wall positioned within the interior of said casing in the path of forward movement of said ram;
  (f) a rear anvil wall positioned within the interior of said casing in the path of rearward movement of said ram;
  (g) a compressed air inlet at the rear end of the interior of said casing adapted to be connected to an extraneous source of compressed air;
  (h) conduit means for placing said front chamber in communication with said compressed air inlet for urging said ram in a rearward direction;
  (i) primary port means for connecting the forward portion of said rear chamber to the exterior of said casing and adapted to be opened and closed by said ram as it moves toward and away from said front anvil wall;
  (j) auxiliary port means for connecting the rearward portion of said rear chamber to the exterior of said casing and adapted to be closed and opened by said ram as it moves toward and away from said rear anvil wall;
  (k) first valve means for selectively maintaining said auxiliary port means opened or closed independently of the opening and closing thereof by said ram; and
  (l) second valve means for connecting and disconnecting said rear chamber to said source of compressed air.

12. A two-way ground burrowing device according to claim 11 wherein said first valve means includes:
  (a) a slider member slidably positioned within said casing for movement between a first forward position closing said auxiliary port means, a second rearward position spaced rearwardly of said auxiliary port means and a third forward position located between said first and second positions and spaced rearwardly of said auxiliary port means;
(b) control port means for directing compressed air against said slider member to urge it forwardly selectively toward said first forward position and said third forward position;
(c) means continuously exerting a predetermined force urging said slider member to said second rearward position, said predetermined force being less than the pressure of the compressed air operating said device; and
(d) guiding means for controlling the axial movement of said slider member between said first, second and third positions, said guiding means being constructed to successively locate said slider member in said first and third positions each time said compressed air through said control port means is discontinued and thereafter re-established.

13. A two-way ground burrowing device comprising:
(a) an elongated outer casing having a tapered forward end and a hollow interior;
(b) a ram disposed within the interior of said casing for axial movement therealong, said ram having a front section of reduced cross-sectional dimension and a rear section of enlarged cross-sectional dimension;
(c) first supporting means for slidably and sealingly supporting the front section of said ram about its outer periphery;
(d) second supporting means for slidably and sealingly supporting the rear section of said ram about its outer periphery;
(e) a first chamber disposed within the interior of said casing and communicating with the front end of said ram;
(f) a second chamber disposed within the interior of said casing and communicating with the intermediate portion of the piston where the front and rear sections join each other, said second chamber being isolated from said first chamber;
(g) a third chamber disposed within the interior of said casing and communicating with the rear end of said ram, said third chamber being isolated from said second chamber and having one wall thereof defined by said second supporting means;
(h) a front anvil wall positioned within the interior of said casing in the path of forward movement of said ram;
(i) a rear anvil wall positioned within the interior of said casing in the path of rearward movement of said ram;
(j) a compressed air inlet at the rear end of the interior of said casing adapted to be connected to an extraneous source of compressed air;
(k) conduit means for continuously maintaining said first chamber in communication with said compressed air inlet for continuously urging said ram in a rearward direction;
(l) first port means for continuously maintaining said second chamber in communication with the exterior of said casing;
(m) second port means in the second supporting means for connecting the forward end of said third chamber to the exterior of said casing, said second port means being located immediately rearwardly of the rear end of said ram when said ram is in its forwardmost position abutting said front anvil wall and adapted to be closed from communication with said third chamber by the rear section of said ram when said ram is spaced rearwardly of said front anvil wall;
(n) third port means for connecting the rearward end of said rear chamber to the exterior of said casing, said third port means being located in the second support means whereby it is closed by the rear section of said ram immediately before said ram reaches its rearwardmost position abutting said rear anvil wall;
(o) first valve means for selectively maintaining said third port means opened or closed independently of the opening and closing thereof by said ram, said first valve means including:
(1) a slider member slidably positioned within said casing for movement between a first forward position sealing said third port means, a second rearward position spaced rearwardly of said third port means and a third forward position located between said first and second positions and spaced rearwardly of said third port means;
(2) a wall surface connected to said slider member and facing rearwardly of said device;
(3) fourth port means for directing compressed air against said wall surface to urge said slider member forwardly selectively toward said first forward position and said third forward position;
(4) spring means continuously exerting a predetermined force in the rearward direction of said device to urge said slider member to said second rearward position, said predetermined force being less than the pressure of the compressed air operating said device; and
(5) guiding means for controlling the axial movement of said slider member between said first, second and third positions, said guiding means being constructed to successively locate said slider member in said first and third positions each time said compressed air through said fourth port means is discontinued and thereafter re-established; and
(p) second valve means for connecting and disconnecting said third chamber to said source of compressed air, said second valve means being responsive to changes in pressure in said third chamber and being opened by increased pressure in said third chamber.

14. A two-way ground burrowing device according to claim 13 wherein said guiding means includes:
(a) a circumferentially extending ball race connected to said slider member and facing radially inwardly of said device;
(b) a ball member disposed in said ball race;
(c) an axially extending concentrically located surface facing said race; and
(d) a guide track in said surface for supporting said ball member in said ball race, said guide track having:
(1) a first branch section extending obliquely through a first predetermined distance toward the front of said device;
(2) a second branch section connected to said first branch section at a point rearwardly of its forward end and extending obliquely toward the rear of said device;
(3) a third branch section connected to said second branch section at a point forwardly of its rearward end and extending obliquely through a second predetermined distance less than said first predetermined distance toward the front of said device; and
(4) a fourth branch section connected to said third branch section at a point rearwardly of its forward end and extending obliquely toward the rear of said device and connecting to another first branch section at a point forwardly of its rearward end, said arrangement of said branch sections being repeated to form a continuous track around said surface whereby every other time compressed air is supplied to said device to act against said wall surface, said ball member will be caused to move to the forward end of said first branch section to move said slider member into said first position during operation of said device and every alternate time compressed air is supplied to said device said ball member will be caused to move to the forward end of said third branch section to move said slider member into said third position located between said first and second positions and spaced rearwardly of said third port means during operation of said device.

References Cited
UNITED STATES PATENTS

| | | | |
|---|---|---|---|
| 1,292,429 | 1/1919 | Bull | 173—91 |
| 2,312,367 | 3/1943 | Gartin | 91—236 |
| 3,137,483 | 6/1964 | Zinkiewicz | 173—91 |

JAMES A. LEPPINK, *Primary Examiner.*